(12) United States Patent
Jiang et al.

(10) Patent No.: US 6,621,649 B1
(45) Date of Patent: Sep. 16, 2003

(54) WRITE-TO-READ SWITCHING IMPROVEMENT FOR DIFFERENTIAL PREAMPLIFIER CIRCUITS IN HARD DISK DRIVE SYSTEMS

(75) Inventors: Hong Jiang, Plano, TX (US); Indumini Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 326 days.

(21) Appl. No.: 09/709,699

(22) Filed: Nov. 10, 2000

(51) Int. Cl.$^7$ .................................................. G11B 5/02
(52) U.S. Cl. ............................................. 360/67; 360/46
(58) Field of Search ........................................ 360/67, 46

(56) References Cited

U.S. PATENT DOCUMENTS

| | | | |
|---|---|---|---|
| 5,446,601 A | * 8/1995 | Fukuta | 360/46 |
| 5,822,142 A | 10/1998 | Hicken | 360/53 |
| 6,028,727 A | 2/2000 | Vishakhadatta et al. | 360/51 |
| 6,111,712 A | 8/2000 | Vishakhadatta et al. | 360/51 |
| 6,112,324 A | 8/2000 | Howe et al. | 714/763 |
| 6,172,548 B1 | * 1/2001 | Cameron et al. | 327/309 |
| 6,219,194 B1 | * 4/2001 | Stein et al. | 360/66 |
| 6,424,480 B1 | * 7/2002 | Bhandari et al. | 360/67 |

FOREIGN PATENT DOCUMENTS

EP          0468472 A1 *  1/1992  .......... G11B/20/10

* cited by examiner

*Primary Examiner*—David Hudspeth
*Assistant Examiner*—Dan I Davidson
(74) *Attorney, Agent, or Firm*—W. Daniel Swayze, Jr.; W. James Brady; Frederick J. Telecky, Jr.

(57) ABSTRACT

The present invention relates to a preamplifier circuit comprising a plurality of amplifier stages coupled together and operable to consecutively amplify a signal associated with a head of a hard disk drive. The preamplifier circuit further comprises a power delivery circuit operably coupled to the amplifier stages and operable to provide power to the amplifier stages in a substantially concurrent manner when the hard disk drive is transitioning from a write state to a read state. In addition, the circuit comprises a control circuit operably coupled to the amplifier stages, and operable to activate at least two of the plurality of amplifier stages in a generally consecutive manner after the providing of power to the amplifier stages. In the above manner a saturation of an output of the preamplifier circuit is avoided by preventing substantially a propagation of glitches through the preamplifier circuit and providing for a substantially fast write-to-read transition time.

25 Claims, 4 Drawing Sheets

WRITE-TO-READ SWITCHING IMPROVEMENT FOR DIFFERENTIAL PREAMPLIFIER CIRCUITS IN HARD DISK DRIVE SYSTEMS

FIELD OF THE INVENTION

The present invention relates in general to the field of mass storage devices, and more particularly to a system and method for enhancing write-to-read switching times in a preamplifier circuit.

BACKGROUND OF THE INVENTION

Hard disk drives such as the exemplary drive 10 illustrated in FIG. 1 include a stack of magnetically coated platters 12 that are used for storing information. The magnetically coated platters 12 are mounted together in a stacked position through a spindle 14 which may be referred to as a platter stack. The platter stack is typically rotated by a motor that is referred to as a spindle motor or a servo motor (not shown). A space is provided between each platter to allow an arm 18 having a read/write head or slider 20 associated therewith to be positioned on each side of each platter 12 so that information may be stored and retrieved. Information is stored on each side of each platter 12 and is generally organized into sectors, tracks, zones, and cylinders.

Each of the read/write heads or sliders 20 are mounted to one end of the dedicated suspension arm 18 so that each of the read/write heads may be positioned as desired. The opposite end of each of the suspension arms 18 are coupled together at a voice coil motor 16 (VCM) to form one unit or assembly (often referred to as a head stack assembly) that is positionable by the voice coil motor. Each of the suspension arms 18 are provided in a fixed position relative to each other. The voice coil motor 16 positions all the suspension arms 18 so that the active read/write head 20 is properly positioned for reading or writing information. The read/write heads 20 may move from at least an inner diameter to an outer diameter of each platter 12 where data is stored. This distance may be referred to as a data stroke.

Hard disk drives also include a variety of electronic circuitry for processing data and for controlling its overall operation. This electronic circuitry may include a preamplifier, a read channel, a write channel, a servo controller, a motor control circuit, a read-only memory (ROM), a random-access memory (RAM), and a variety of disk control circuitry (not shown) to control the operation of the hard disk drive and to properly interface the hard disk drive to a system bus. The preamplifier may contain a read preamplifier and a write preamplifier that is also referred to as a write driver. The preamplifier may be implemented in a single integrated circuit or in separate integrated circuits such as a read preamplifier and a write preamplifier or write driver. The disk control circuitry generally includes a separate microprocessor for executing instructions stored in memory to control the operation and interface of the hard disk drive.

Hard disk drives perform write, read, and servo operations when storing and retrieving data. Generally, a write operation includes receiving data from a system bus and storing the data in the RAM. The microprocessor schedules a series of events to allow the information to be transferred from the RAM to the platters 12 through the write channel. Before the information is transferred, the read/write heads 20 are positioned on the appropriate track and the appropriate sector of the track is located. The data from the RAM is then communicated to the write channel as a digital write signal. The write channel processes the digital write signal and generates an analog write signal. In doing this, the write channel may encode the data so that the data can be more reliably retrieved later. The digital write signal may then be provided to an appropriate read/write head 20 after first being conditioned by the preamplifier. Writing data to the recording medium or platter 12 is typically performed by applying a current to a coil of the head 20 so that a magnetic field is induced in an adjacent magnetically permeable core, with the core transmitting a magnetic signal across a spacing of the disk to magnetize a small pattern or digital bit of the media associated with the disk.

Circuitry associated with a read operation is illustrated in FIG. 2, and designated at reference numeral 30. In a read operation, the appropriate sector to be read is located and data that has been previously written to the platters 12 is detected. The appropriate read/write head 20 (illustrated as a magneto-resistive load 20a in FIG. 2) senses the changes in the magnetic flux and generates a corresponding analog read signal. The analog read signal is provided back to the electronic circuitry where a preamplifier circuit 32 amplifies the analog read signal. The amplified analog read signal is then provided to a read channel circuit 34 where the read channel conditions the signal and detects "zeros" and "ones" from the signal to generate a digital read signal. The read channel may condition the signal by amplifying the signal to an appropriate level using, for example, automatic gain control (AGC) techniques. The read channel may then filter the signal to eliminate unwanted high frequency noise, equalize the channel, perform the data recovery from the signal, and format the digital read signal. The digital read signal is then transferred from the read channel and is stored in the RAM (not shown). The microprocessor may then communicate to the host that data is ready to be transferred.

The read channel circuit 34 may be implemented using any of a variety of known or available read channels. For example, the read channel 34 may be implemented as a peak detection type read channel or as a more advanced type of read channel utilizing discrete time signal processing. The peak detection type read channel involves level detecting the amplified analog read signal and determining if the waveform level is above a threshold level during a sampling window. The discrete time signal processing type read channel synchronously samples the amplified analog read signal using a data recovery clock. The sample is then processed through a series of mathematical manipulations using signal processing theory to generate the digital read signal. There are several types of discrete time signal processing read channels such as a partial response, maximum likelihood (PRML) channel; an extended PRML channel; an enhanced, extended PRML channel; a fixed delay tree search channel; and a decision feedback equalization channel.

As the disk platters 12 are rotating, the read/write heads 20 must align or remain on a particular track in order to accurately read the data thereon. This is accomplished by a servo operation through the use of a servo controller provided in a servo control loop. Referring to FIG. 3 which represents a plan view of an exemplary platter 12, in a servo operation a servo wedge 40 is read from a track 42 that generally includes track identification information and track misregistration information 44. The track misregistration information may also be referred to as position error information. The position error information 44 may be provided as servo bursts and may be used during both read and write operations to ensure that the read/write heads are properly aligned on a track. As a result of receiving the position error information, the servo controller generates a corresponding control signal to position the read/write heads 20 via the voice coil motor. The track identification information 44 from the servo wedge 40 is also used during read and write operations so that a track 42 may be properly identified.

Hard disk drive designers strive to provide higher capacity drives that operate at a high signal-to-noise ratio and a low bit error rate. To achieve higher capacities, the density of the data stored on each side of each platter must be increased. This places significant burdens on the hard disk drive electronic circuitry. For example, as the density increases, the magnetic transitions that are used to store data on the platters must be physically located more closely together. This often results in intersymbol interference when performing a read operation. As a result, the hard disk drive electronic circuitry must provide more sophisticated processing circuitry that operates at higher frequencies to accurately process the intersymbol interference and the higher frequency read signal. In some cases, the spindle motor speed is increased which further increases the frequency of the read signal and the write signal. Furthermore, the increase in density requires that the servo control system be provided with a higher bandwidth to increase the read/write head positioning resolution.

As discussed above, to account for the increased data storage density, the spindle motor speed is being increased from a platter rotational speed of about 5400 RPMs to about 7200 RPMs or greater. To account for the increased speed, the write-to-read transition timing for a head 20 becomes important. For example, when performing a write operation, the head 20 is traversing a track 42 on the platter 12 as the platter spins there beneath. As illustrated in FIG. 3, when a servo region or wedge 40 is encountered, the head 20 must quickly transition from a write state to a read state in order to read the servo information stored therein and then quickly transition back to a write state in order to continue writing the data to the platter 12. If the write-to-read transition timing is slow, then the servo wedge 40 must be larger since the platter is rotating at a generally constant speed. Since many servo wedges 40 exist on the platter 12 (e.g., about 60) an optimized write-to-read transition timing allows for the wedges 40 to be minimized, thereby increasing data storage density thereon.

There is a need in the art to provide a preamplifier circuit which exhibits reduced write-to-read switching times.

SUMMARY OF THE INVENTION

The present invention relates to a system and method for reducing a write-to-read switching time in a hard disk drive preamplifier circuit.

According to the present invention, the write-to-read switching time is reduced from conventional preamplifier circuits by incorporating a concurrent application of DC bias voltages to all stages of the preamplifier circuit while instituting a staggered squelch deactivation mechanism to prevent saturation of the preamplifier circuit. By applying the DC bias voltages to all stages of the preamplifier circuit substantially concurrently, a settling time associated with all the amplifier stages is reduced, thereby allowing the preamplifier circuit to begin reading data at an earlier time when switching from a write state to a read state. In addition, the staggered squelch deactivation mechanism allows for the concurrent application of DC bias voltages by preventing glitches that may be generated by the DC bias voltages from saturating the amplifier circuit.

The present invention also may include a pole shifting component in the preamplifier circuit that is operable to prevent low frequency glitches that may occur due to the staggered squelch deactivation mechanism from saturating the preamplifier circuit. The pole shifting component is selectively employable or programmable such that upon activation, a pole is shifted for a predetermined period of time, at which point a cutoff frequency associated with a high pass filter is increased to ensure rejection of any such glitches through the preamplifier circuit. After the predetermined time, the pole is shifted back to its original position, thereby reducing the cutoff frequency of the high pass filter to permit reading of data at lower frequencies in an expeditious manner.

According to one aspect of the present invention, a preamplifier circuit comprises a plurality of amplifier stages which are operable to consecutively amplify a signal detected by a head of a hard disk drive. The preamplifier circuit further comprises a power delivery circuit which is operably coupled to the amplifier stages and operable to provide power to each of the amplifier stages in a substantially concurrent manner, thereby reducing a settling time associated therewith. In addition, a control circuit is operably coupled to the amplifier stages and is operable to activate the amplifier stages by deactivating a squelch mechanism associated therewith in a staggered manner, thereby eliminating or otherwise mitigating glitches associated with the substantially concurrent application of power to the amplifier stages from saturating the preamplifier circuit.

According to another aspect of the present invention, the preamplifier circuit comprises a pole shifting circuit operably coupled to one of the amplifier stages which is operable to interface with such amplifier stage to form a programmable high pass filter circuit. The high pass filter may be programmable to the extent that when a read state is detected, for example, the cutoff frequency associated therewith is increased to reject low frequency noise which may be generated by the concurrent DC bias application and/or the staggered squelch deactivation and thus prevent saturation of the preamplifier circuit. After a predetermined period of time, the cutoff frequency is decreased by shifting a pole associated therewith to about its original position to allow for passing of data therethrough which may exist at lower signal frequencies.

According to still another aspect of the present invention, a preamplifier circuit comprises a plurality of differential amplifier stages coupled together in series. The preamplifier circuit comprises a DC bias delivery circuit which is operable to delivery positive and negative DC bias voltages to each of the amplifier stages at about the same time when a read mode is detected. Application of such DC bias voltages to each of the amplifier stages at about the same time reduces an aggregate settling time for all of the amplifier stages and thus permits reading data more quickly than conventional solutions. In addition, the preamplifier circuit comprises a squelch circuit which is operable to short out the differential input or output of multiple amplifier stages in a staggered manner according to a predetermined timing after the read mode is detected. By staggering a deactivation of various squelch conditions for the multiple amplifier stages, glitches associated with the substantially concurrent DC bias voltage application and earlier squelch deactivations are prevented from saturating the preamplifier circuit.

According to yet another aspect of the present invention, a programmable high pass filter circuit operates in conjunction with the above DC bias delivery circuit and the squelch circuit to prevent low frequency noise or glitches associated therewith from adversely impacting a write-to-read switching time. The programmable high pass filter is operable to shift a pole upon a detection of a read mode to increase a cutoff frequency associated therewith. Consequently, any low frequency glitches or excursions that may be generated by the squelch circuit is rejected in the preamplifier circuit during write-to-read switching. After a predetermined period of time, the cutoff frequency is reduced by shifting back the pole to about its original position to allow for low frequency data which is read by the head to pass therethrough.

According to another aspect of the present invention, a method of reducing a write-to-read switching time in a hard disk drive preamplifier circuit is disclosed. The method comprises detecting an initiation of a read mode and coupling DC bias voltages to a plurality of amplifier stages in the preamplifier circuit at about the same time. Consequently, an aggregate settling time associated with the powering up of the amplifier stages is reduced. In addition, the method comprises selectively activating the amplifier stages in a predetermined order by deactivating one or more squelch conditions associated therewith in a staggered fashion upon detection of the detected read state. Such selective activation prevents glitches associated with the application of the DC bias voltages from saturating the preamplifier circuit.

According to still another aspect of the present invention, the method of reducing the write-to-read switching time further comprises increasing a cutoff frequency of a high pass filter associated with the amplifier stages upon detecting the read state to thereby reject low frequency glitches or noise caused by the DC bias voltages or the selective activation of the amplifier stages in a predetermined order. After a predetermined period of time, the cutoff frequency is reduced back to an original value to thereby allow low frequency data signals to pass therethrough.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
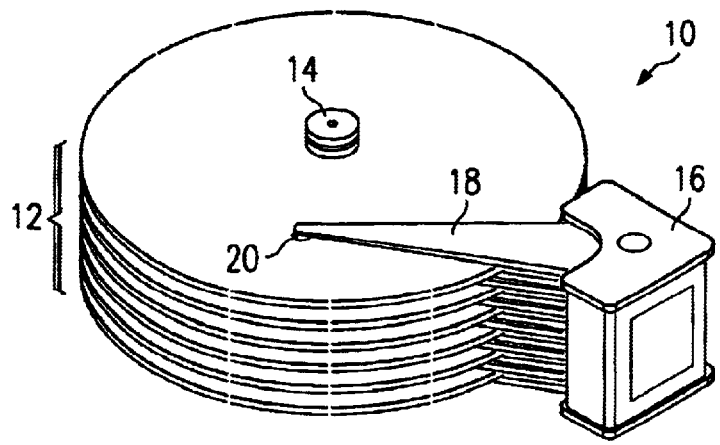
FIG. 1 is a perspective view of a prior art disk drive mass storage system.
Figure 2:
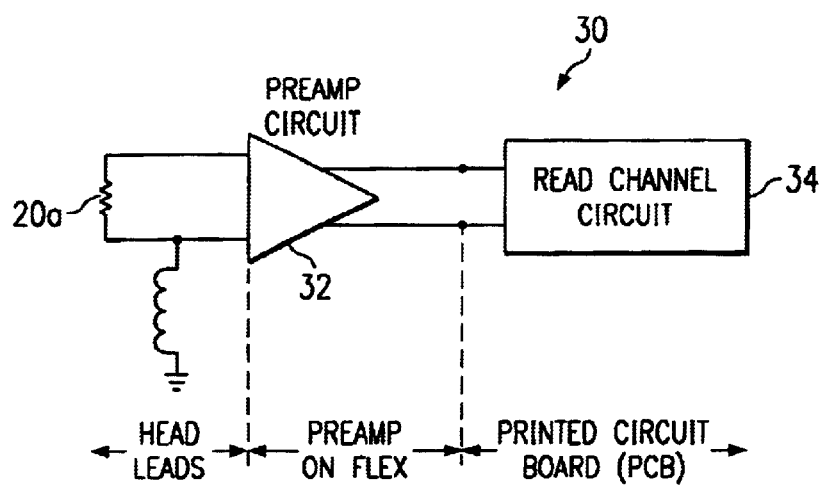
FIG. 2 is a schematic diagram illustrating circuitry associated with read/write operations in a disk drive mass storage system.
Figure 3:
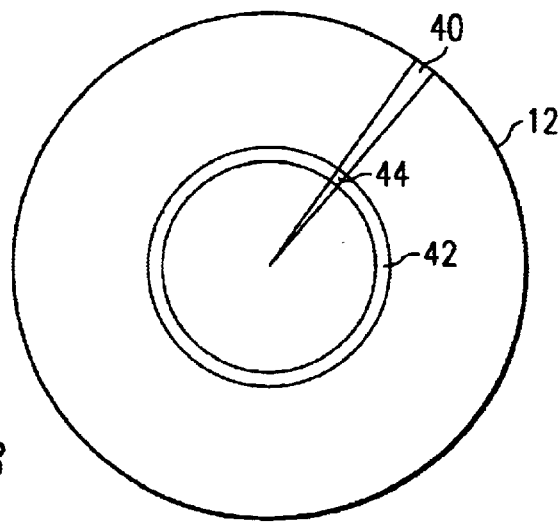
FIG. 3 is a plan view illustrating a platter having a servo wedge associated therewith for use in positioning a read/write head accurately thereon.

The present invention will now be described with respect to the accompanying drawings in which like numbered elements represent like parts. The present invention is directed to a system and method of reducing a write-to-read switching time in a hard disk drive system.

In order to understand various principles associated with the present invention, a brief explanation of a write-to-read switching time is provided below. When a hard disk drive is in a write mode, a read portion of the preamplifier circuit is powered down to reduce power consumption and to prevent spurious noise, etc. from passing through to an output of the read portion of the preamplifier circuit. When the hard disk drive system switches from a write operation to a read operation, the read portion of the preamplifier circuit must be powered up in order to initiate a read operation. The powering up of the read portion of the preamplifier circuit requires a settling of various circuits therein. The time it takes for the preamplifier circuit to settle within 10 mV of its final settling value is typically defined as the preamplifier's write-to-read switching time. As is evident from the discussion above, it is desirable to minimize the write-to-read switching time in order to maximize utilization of the disk drive.

The inventors of the present invention appreciated that several aspects of conventional preamplifier circuits negatively contribute to an undesirably long write-to-read switching time. In order to appreciate various aspects of the present invention, a conventional preamplifier circuit will be discussed briefly in conjunction with FIG. 4, which is designated at reference numeral 100. The preamplifier circuit 100 comprises a plurality of differential amplifier stages 102, 104, 106 and 108 coupled together in series. The first amplifier 102 is a high gain stage amplifier which detects a differential signal across the head (depicted as load resistance $R_{MR}$) and outputs an amplified signal associated therewith at its output. The second amplifier stage 104 typically multiplexes several read channels together, such that signals from multiple heads driving multiple first stages 102 are multiplexed into a single second stage 104 and amplified on its output. The third and fourth amplifier stages 106 and 108 typically are low gain stages and perform various functions such as gain control.

Figure 4:
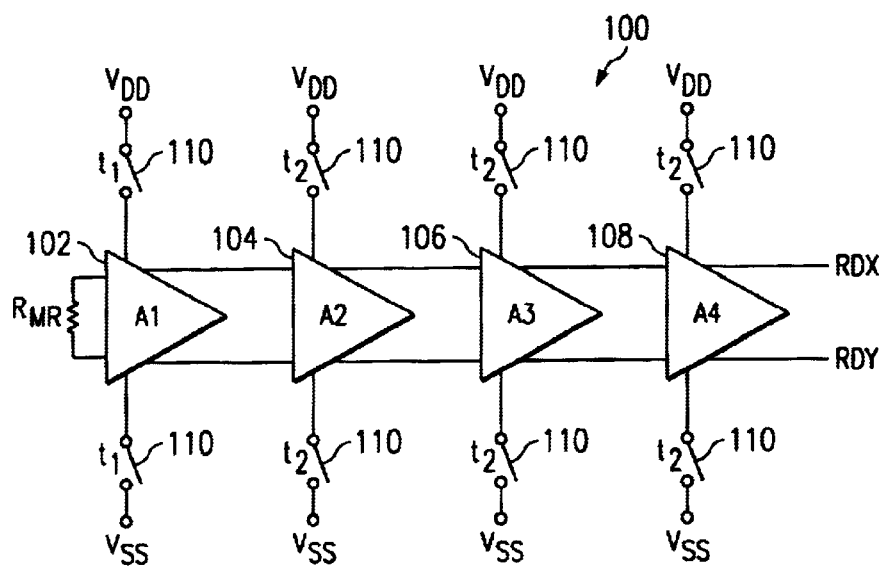
FIG. 4 is a schematic diagram illustrating a conventional four-stage preamplifier circuit having an incremental DC bias voltage control configuration.

When the preamplifier circuit 100 is in a write mode, the multiple stages 102, 104, 106 and 108 are not powered up in order to reduce power consumption. That is, the DC bias voltages such as $V_{DD}$ and $V_{SS}$ are not applied to the various stages, for example, by disconnecting such DC bias voltages via switches 110 as illustrated in FIG. 4. When a read mode is detected, a control circuit (not shown) powers up the amplifier stages 102, 104, 106 and 108 by closing the switches 110 via a plurality of control signals. In order to avoid glitches associated with the DC bias voltages from saturating the preamplifier circuit 100, however, the control circuit first closes switches associated with the first amplifier stage 102 (e.g., at time $t_1$) and then waits for the high gain amplifier stage 102 to settle before closing the switches for the other stages (e.g., at a later time $t_2$). Such consecutive activation of the amplifier stages is to prevent glitches which may be generated in the stage by the coupling of the DC bias voltage from propagating and getting amplified through the various stages and saturating the preamplifier circuit.

Accordingly, conventional preamplifier circuit such as the circuit 100 apply the DC bias voltages to the amplifier stages in two or more discrete time periods such that the aggregate settling time for the entire preamplifier circuit 100 is based on a combination of the settling times of the first stage 102 and the other stages 104, 106 and 108. It was appreciated by the inventors of the present invention that such an aggregate settling time adversely impacts the write-to-read switching time of the preamplifier circuit.

Figure 5:
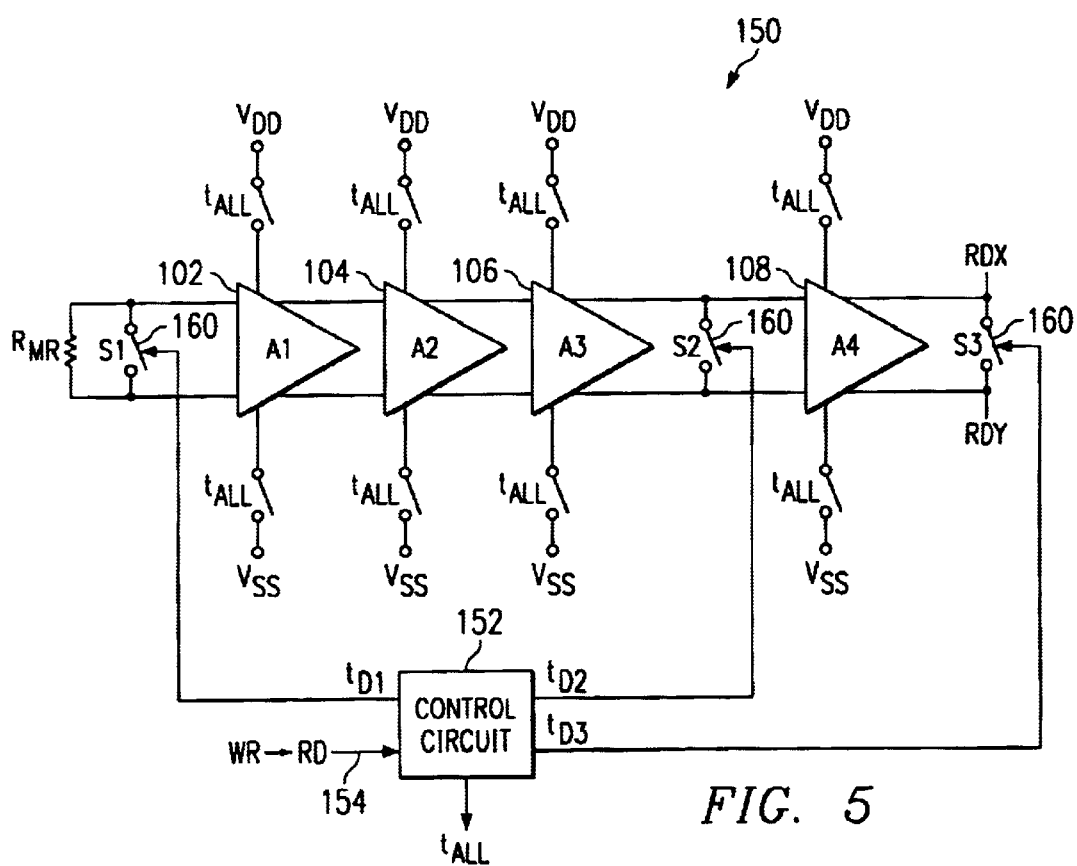
FIG. 5 is a schematic diagram illustrating a four-stage preamplifier having a DC bias voltage configuration and squelch circuitry which facilitates improved write-to-read switching times according to the present invention.

A preamplifier circuit according to one exemplary aspect of the present invention is illustrated in FIG. 5, and designated at reference numeral 150. The preamplifier circuit 150 comprises the plurality of differential amplifier stages 102, 104, 106 and 108 coupled together in series in a manner similar to FIG. 4. In addition, the preamplifier circuit 150 also has DC bias voltages $V_{DD}$ and $V_{SS}$ which are selectively coupled to the amplifier stages via the switches 110. The preamplifier circuit 150 differs from the conventional preamplifier circuit 100 of FIG. 4 in that the DC bias voltages are delivered to the amplifier stages in a substantially concurrent manner. That is, upon detection of a read mode condition, the DC bias voltages are coupled to each of the multiple amplifier stages at about the same time, for example, substantially simultaneously. To that end, the preamplifier circuit 150 includes a power delivery circuit such as a control circuit 152 which is operable to detect an initiation of a read mode via a signal 154 and generate a plurality of control signals to activate each of the switches 110 at about the same time (e.g., $t_{all}$).

In addition, the preamplifier circuit 150 of FIG. 5 further includes a squelch circuit illustrated collectively by reference numeral 160. The squelch circuit 160 is operable to activate several of the amplifier stages in a predetermined order upon the detection of the read mode via, for example, the control circuit 152. According to one exemplary aspect of the present invention, the squelch circuit 160 comprises a plurality of switches S1, S2 and S3 coupled across a differential input or output of various ones of the amplifier stages. When closed in a write mode, the switches S1, S2 and S3 short out amplifier stages 102 and 108 and prevent any spurious noise or glitches from the head $R_{MR}$ from passing therethrough to the output thereof (illustrated, for example, as differential output RDX and RDY).

When the read mode is detected by the control circuit 152, the squelch circuit 160 is operable to activate the multiple amplifier stages by opening the switches S1, S2 and S3 in a predetermined order. For example, after waiting a predetermined time period (e.g., $t_{D1}$), the control circuit 152 opens switch S1, thus activating the first amplifier stage 102. Then, after awaiting another predetermined time after the read mode is detected (e.g., $t_{D2}$), the control circuit 152 opens switch S2, and after time period $t_{D3}$, S3 is opened. Therefore the squelch circuit 160 and the control circuit 152 operate to open the switches S1, S2 and S3 in a staggered fashion.

The squelch circuit 160 operates to prevent glitches associated with the substantially concurrent application of DC bias voltages to the amplifier stages. For example, when $V_{DD}$ and $V_{SS}$ are applied to the amplifier stages 102, 104, 106 and 108, glitches are generated therein. Since S1 is closed, however, indicating a squelch condition, no glitch forms on the output of the first amplifier stage 102. Likewise, any glitches generated in amplifier stages 104 and 106 due to the DC bias voltages are squelched by S2 which is closed when the DC bias voltages are provided. Lastly, any glitch generated in the last amplifier stage 108 is squelched by the closed switch S3. Therefore the squelch circuit 160 operates to prevent saturation of the preamplifier circuit 150 when the DC bias voltages are provided to the amplifier stages in a substantially concurrent manner, thus enabling a faster settling time and reducing the write-to-read switching time.

After a predetermined period of time (e.g., $t_{D1}$), any glitches associated with the application of the DC bias voltages are squelched. Then S1 is opened by the control circuit 152. The opening of S1 itself causes a glitch at the output of the amplifier stage 102 that propagates through stages 104 and 106, however, since S2 is still closed, the glitch gets squelched, thus preventing saturation of the preamplifier circuit 150. After the second predetermined period of time has elapsed since the read mode is detected (e.g., $t_{D2}$, wherein $t_{D2} > t_{D1}$), S2 opens which itself causes a glitch in the last amplifier stage 108. Since S3 is still closed, however, the glitch is squelched, thus preventing a saturation of the preamplifier circuit 150. Lastly, after a third predetermined period of time has elapsed after the detection of the read mode (e.g., $t_{D3}$, wherein $t_{D3} > t_{D2}$), S3 is opened, which itself may create a tiny glitch on the output RDX and RDY. Such a glitch, if any, however, is significantly small so as to be negligible.

In the above manner, it is seen how the squelch circuit 160 prevents saturation of the preamplifier circuit 150 due to the DC bias voltage application in a substantially concurrent manner. In addition, it is clear that the staggered deactivation of the switches S1, S2 and S3 further protects the saturation of the preamplifier circuit. Furthermore, due to the delivery of the DC bias voltages to each of the amplifier stages at about the same time, the write-to-read switching time is decreased, and any glitches associated therewith are squelched by the squelch circuit, thereby preventing an undesirable saturation of the preamplifier circuit 150.

Figure 6:
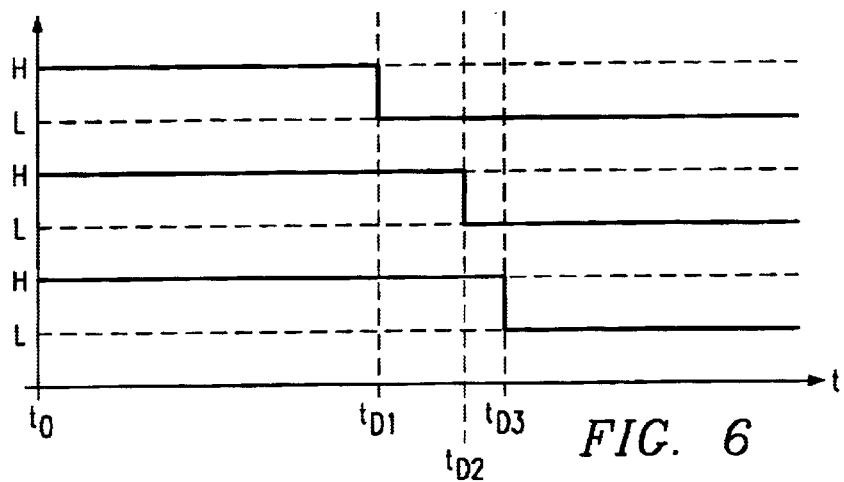
FIG. 6 is a series of waveform diagrams illustrating timing signals for deactivating the various squelches circuits of FIG. 5 according to one aspect of the present invention.

According to one exemplary aspect of the present invention, the staggered activation or opening of switches S1, S2 and S3 are performed in the following manner, as illustrated in FIG. 6. After a read mode is detected (e.g., $t_0$), the control circuit 152 waits a time period $t_{D1}$ (e.g., about 55 ns) which is a time period expected to be long enough to ensure that any glitches associated with the coupling of the DC bias voltages to each of the amplifier stages at about the same time are squelched, thus preventing preamplifier saturation. At $t_{D1}$, S1 opens which causes a glitch to propagate through amplifier stages 102, 104 and 106. Since S2 is still closed, however, any such glitches are squelched. After the control circuit 152 waits the second time period ($t_{D2}$) (e.g., about 65 ns), S2 is opened via the control circuit 152. The 10 ns between $t_{D1}$ and $t_{D2}$ is enough time to ensure that any glitches formed by the opening of S1 are squelched prior to the opening of S2. After the control circuit 152 waits the third time period ($t_{D3}$) (e.g., about 70 ns), S3 is opened via the control circuit 152. The 5 ns between $t_{D2}$ and $t_{D3}$ is enough time to ensure that any glitches formed by the opening of S2 are squelched prior to the opening of S3.

As discussed above the squelch circuit 160 in connection with delivery of the DC bias voltages in a substantially concurrent manner decreases the write-to-read switching time in the preamplifier circuit over conventional solutions. Even with the squelch circuit 160, however, some excursions may still occur during the write-to-read mode transition. For example, when S1 opens, a low frequency, relatively long duration glitch (e.g., having a time constant of about 150 ns, a frequency of about 1–2 MHz) may occur that may propagate through amplifier stages 104, 106 and 108 despite the squelching operations. Therefore according to another aspect of the present invention, a programmable or otherwise selectively employable high pass filter circuit is incorporated into the preamplifier circuit of FIG. 5, for example, by supplementing circuitry associated with the third amplifier stage 106. The present invention contemplates use of a programmable high pass filtering circuit which varies the cutoff frequency thereof based on a detection of a write to read mode transition.

In general, the programmable high pass filter circuit may operate as a pole shifting circuit which is activated to shift a pole associated therewith when a read mode is detected, thereby increasing a cutoff frequency (e.g., from about 1–2 MHz to about 10 MHz) associated therewith for a predetermined period of time. During this predetermined period of time, low frequency excursions associated with the amplifier stages which may otherwise propagate through to the preamplifier output RDX and RDY are rejected since they are below the increased cutoff frequency of the high pass filter. After the predetermined period of time (e.g., $t_{DELAY}$ of about 90 ns), the pole is shifted back to about its original position, thereby decreasing the cutoff frequency associated therewith (e.g., back to about 1–2 MHz) to allow low frequency data to be read during the read mode.

Figure 7:
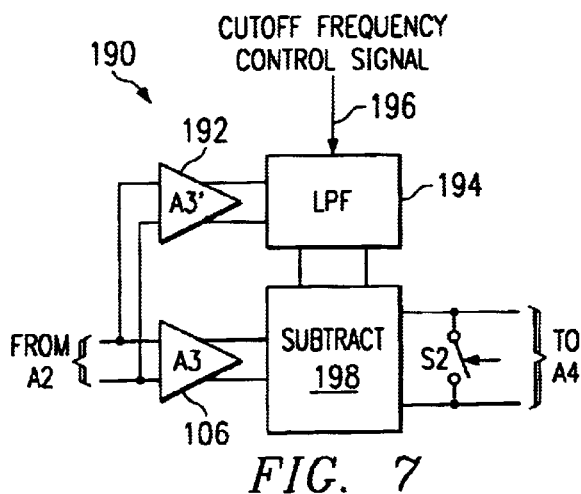
FIG. 7 is a schematic diagram illustrating one amplifier stage of the preamplifier circuit having circuitry for adjusting a cutoff frequency between a first and second frequency utilized in transitioning from a write state to a read state according to one aspect of the present invention.

Turning now to FIG. 7, a schematic diagram of a high pass filter circuit 190 is illustrated according to one exemplary aspect of the present invention. The high pass filter circuit 190 comprises another amplifier stage 192 coupled in parallel with the third amplifier stage 106, wherein the amplifier stages 106 and 192 have the same gain associated therewith. The differential output of the amplifier stage 192 is fed into a low pass filter circuit (LPF) 194 having a programmable cutoff frequency control signal 196 associated therewith. The control signal 196 is operable to provide a digital type signal, wherein one state dictates a first cutoff frequency and the second state dictates a second cutoff frequency, respectively. The output of the low pass filter circuit 194 results in a signal in which all signal frequency components which exceed the cutoff frequency are rejected. The output of the low pass filter circuit 194 is then fed to a subtraction circuit 198 in which the output of low pass filter circuit 194 is subtracted from the output of the third amplifier stage 106. The output of the subtraction circuit thus results in a signal in which all signal frequency components below the cutoff frequency of the LPF 194 are rejected, thereby operating macroscopically as a high pass filter.

The high pass filter circuit 190 has a programmable cutoff frequency which is controlled by the cutoff frequency control signal 196 from, for example, the control circuit 152. Initially, prior to a read mode, for example, during a write mode, the cutoff frequency of the low pass filter circuit 194 is set at a first, lower frequency (e.g., about 1–2 MHz). According to one exemplary aspect of the present invention, the control signal 196 changes state when the read mode is detected and the low pass filter circuit 194 is operable to adjust its cutoff frequency to a second, higher frequency (e.g., about 10 MHz). During this time, the high pass filter circuit 190 is operable to reject any noise or low frequency excursions which fall below the second cutoff frequency which is now a larger range of frequencies. After a predetermined period of time (e.g., about 90 ns) when any such low frequency excursions are expected to have been discharged, the control signal 196 again changes state, thereby lowering the cutoff frequency of the low pass filter circuit 194 back to its original cutoff frequency for the remainder of the read mode. With the lower cutoff frequency re-established, the high pass filter circuit 190 will pass lower frequency signals in the 2 MHz range which may comprise data read by the head.

Figure 8A:
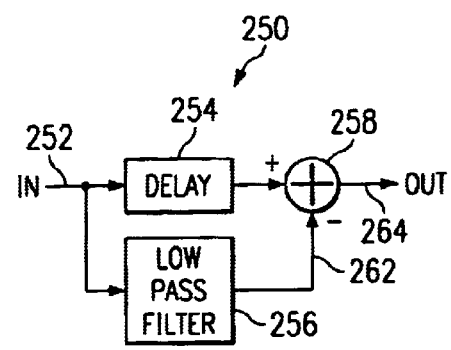
FIG. 8a is a block diagram illustrating a circuit for shifting a pole associated with a preamplifier between a first and second frequency according to one aspect of the present invention.

To further illustrate how the high pass filter circuit 190 of FIG. 7 operates, one exemplary functional circuit for shifting the pole of the high pass filter circuit 190 is illustrated in FIG. 8a and designated at reference numeral 250. The circuit 250 includes an input 252 in which the output of the amplifier stage 106 is fed into a delay block 254 and a low pass filter circuit 256. The delay block 254 is advantageously employed to synchronize the subsequent subtraction of the input 254 from a filtered version of the input at the decision block 258. The low pass filter 256 is operable to pass signals having a frequency below a cutoff frequency, the cutoff frequency $F_{LPF}$ being a function of the desired pole.

Figure 8B:
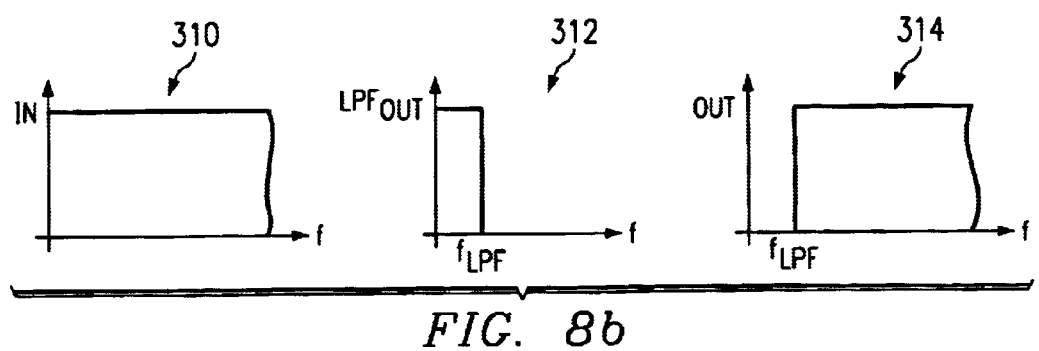
FIG. 8b is a series of waveform diagrams illustrating an exemplary manner of shifting a pole between a first and second frequency according to the present invention.

FIG. 8b illustrates an exemplary low pass response for the low pass filter 194 in a read state, wherein signals having frequencies above the cutoff frequency $f_{LPF}$ are rejected. As illustrated in FIG. 8b, a first graph 310 represents a frequency range associated with an input signal to the low pass filter 194 and a second graph 312 represents a frequency range associated with the output of the low pass filter 194. By subtracting the low pass response 312 from that of response 310, a high pass response 314, as illustrated in FIG. 8b, wherein the low frequency cutoff $F_{LPF}$ is a function of the cutoff frequency of the low pass filter. Therefore by varying the cutoff frequency of the low pass filter 194, the pole of the circuit may be moved from a first frequency to a second frequency when the preamplifier is transitioning from a non-read state such as the write state to the read state.

Figure 9:
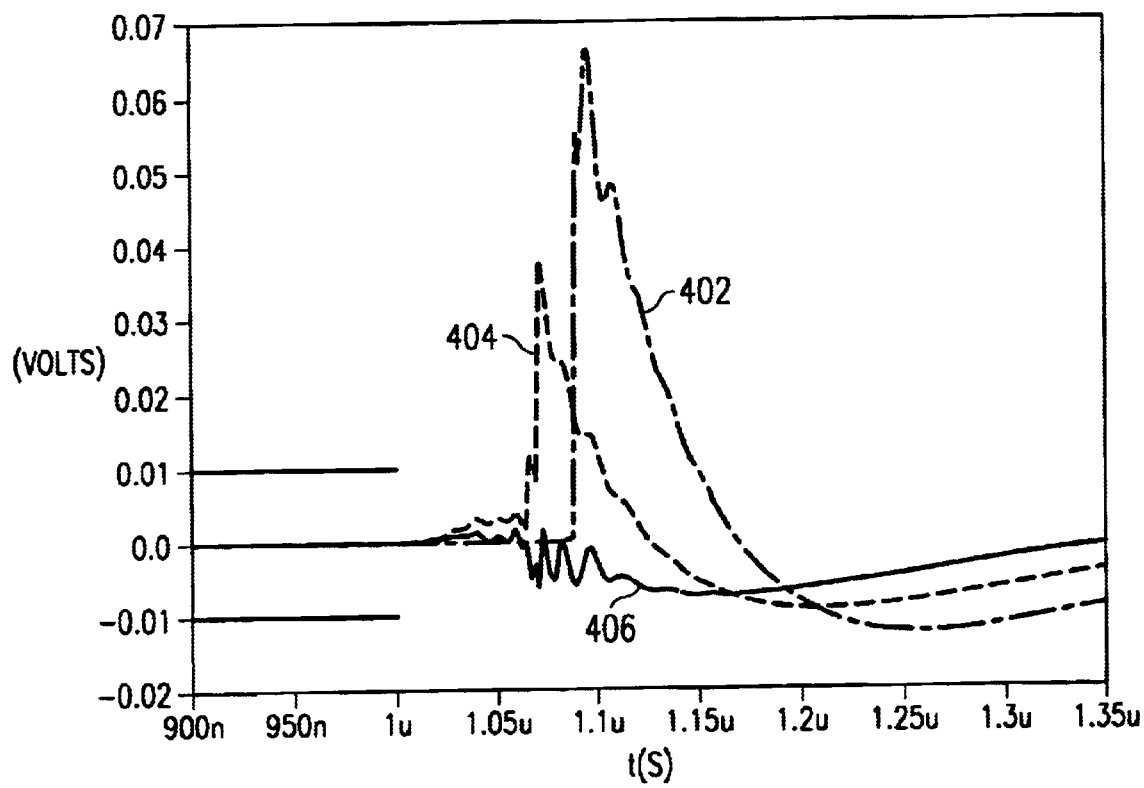
FIG. 9 is a series of waveform diagrams illustrating a performance impact of several aspects of the present invention on a write-to-read switching time according to the present invention.

As discussed above, the various aspects of the present invention operate together to reduce a write-to-read switching time of the preamplifier circuit without allowing glitches, noise, etc. from saturating the circuit. To illustrate the advantageous performance advantages associated with the present invention, FIG. 9 illustrates the write-to-read switching times of three different preamplifier circuit. One voltage waveform 402 is associated with the conventional preamplifier circuit 100 of FIG. 4. Note that such a preamplifier circuit 100 consecutively applies the DC bias voltages upon detection of a read mode at about the 1 microsecond time period. The waveform 402 ultimately is within about 10 mV of its final intended settling time value of 0V within about 350 nS which is about the write-to-read switching time of the conventional preamplifier circuit 100.

A second waveform 404 illustrates the preamplifier circuit 150 of FIG. 5 which applies the DC bias voltages to each of the amplifier stages at about the same time, and incorporates a squelch circuit to mitigate glitches associated therewith. Note that the waveform 404 indicates a shorter aggregate settling time for the amplifier stages to be operational (as indicated by the earlier initial spike than the waveform 402). However, the waveform 404 show a relatively low frequency glitch propagating therethrough, thus resulting in a write-to-read switching time of about 200 nS, which still represents a significant improvement over the preamplifier circuit 100.

Lastly, FIG. 9 illustrates a third waveform 406 that incorporates the preamplifier circuit 150 with the programmable high pass filter circuit 190 of FIG. 7. Note that in the waveform 406, the low frequency glitch of waveform 404 has been filtered out. Therefore the signal of waveform 406 does not extend outside the 10 mV guardband used to measure the write-to-read switching time. However, because the programmable period in which the cutoff frequency is increased to about 10 MHz is about 90 nS, and since it takes about another 10 nS to move the cutoff frequency back to about 1–2 MHz, the minimum time at which data reading may commence is about 100 nS. Therefore a combination of the various aspects of the present invention allow for a reduction in the write-to-read switching time of the preamplifier from about 350 nS to about 100 nS.

Figure 10:
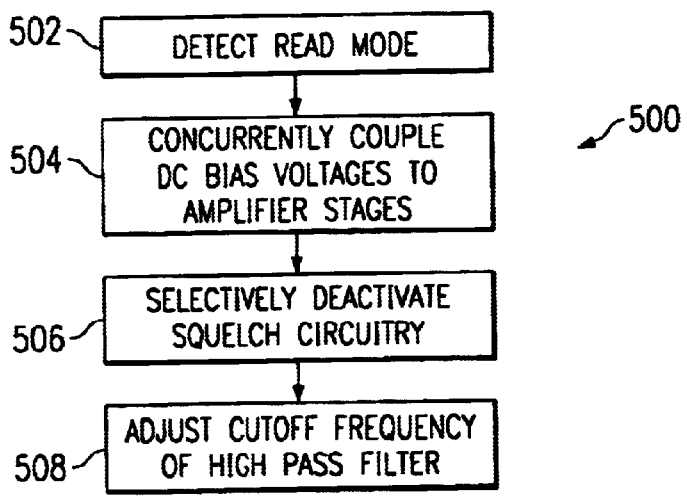
FIG. 10 is a flowchart illustrating a method of reducing a write-to-read switching time in a hard disk drive preamplifier circuit according to another aspect of the present invention.

According to another aspect of the present invention, a method of reducing a write-to-read switching time is disclosed, as illustrated in FIG. 10. While, for purposes of simplicity of explanation, the methodology of FIG. 10 is shown and described as a series of steps, it is to be understood and appreciated that the present invention is not limited to the order of steps, as some steps may, in accordance with the present invention, occur in different orders and/or concurrently with other steps from that shown and described herein. For example, a methodology in accordance with an aspect of the present invention may be represented as a combination of various states (e.g., in a state diagram). Moreover, not all illustrated steps may be required to implement a methodology in accordance with an aspect the present invention.

Turning now to FIG. 10, the methodology begins at step 502, wherein an initiation of a read mode is detected. For example, such detection may be accomplished by monitoring a status of a binary signal or a value of a digital word which represents a status of the hard disk drive. Any manner, however, of detecting a read mode condition may be utilized and is contemplated as falling within the scope of the present invention.

Recall that when the read portion of the preamplifier circuit is not in the read mode, the amplifier stages therein are not provided power in order to reduce power consumption. Therefore at step 504, after the read mode has been detected, the DC bias voltages used to power each of the amplifier stages are coupled thereto in a substantially concurrent manner. That is, the DC bias voltages are not coupled to selective ones of the amplifier stages and then subsequently applied to other stages after a predetermined wait time in order to allow for settling of the first powered stages as done conventionally. By applying the DC bias voltages to each of the amplifier stages at about the same time, the aggregate settling time for all of the stages to be powered up and ready to operate is reduced substantially.

The method 500 continues at step 506, wherein selective portions of a squelch circuit are deactivated in a staggered fashion. For example, prior to a read state being detected, the portions of the squelch circuit are activated, thereby squelching one or more of the amplifier stages to prevent spurious noise, etc. from passing through the read preamplifier when not in a read mode. When the read mode is detected at step 502, the squelch circuit begins its selective deactivation mode in order to prevent glitches incurred from the concurrent application of the DC bias voltages from saturating the preamplifier.

According to one exemplary aspect of the present invention, step 506 comprises maintaining the squelch conditions on the amplifier stages for a predetermined period of time (e.g., about 55 nS) to ensure the DC bias voltage glitches are squelched effectively. Then a squelch condition on a first amplifier stage (e.g., stage 102) is deactivated while other squelch conditions are maintained, thus preventing glitches therefrom from saturating the preamplifier circuit. Then, after more time (e.g., another 10 nS) another squelch condition associated with the preamplifier circuit output is deactivated. The staggered deactivation of the squelch conditions prevents DC bias glitches from saturating the preamplifier and also prevents glitches associated with the squelch deactivation process itself from saturating the preamplifier.

In addition, after the read mode is detected at step 502, the cutoff frequency of a high pass filter circuit is increased at step 508 for a predetermined period of time. Therefore any low frequency noise or excursions caused by the squelch deactivation process are rejected. After a predetermined period of time (e.g., about 90 nS), the cutoff frequency of the high pass filter is returned to its original state to permit reading of low frequency data.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

What is claimed is:

1. A preamplifier circuit, comprising:
    a plurality of amplifier stages coupled together and operable to consecutively amplify a signal associated with a head of a hard disk drive;
    a power delivery circuit operably coupled to the amplifier stages and operable to provide power to the amplifier stages in a substantially concurrent manner when the hard disk drive is transitioning from a write state to a read state; and
    a control circuit operably coupled to the amplifier stages, and operable to activate at least two of the plurality of amplifier stages in a generally consecutive manner after the providing of power to the amplifier stages, thereby preventing a saturation of an output of the preamplifier circuit by preventing substantially a propagation of glitches through the preamplifier circuit and providing for a substantially fast write-to-read transition time
    wherein the control circuit is operable to open a previously closed first switch across a differential input of a first amplifier stage of the plurality of amplifier stages after the power delivery circuit has provided power to the plurality of amplifier stages, wherein the control circuit is further operable to open a previously closed second switch coupled across a differential output of a third amplifier stage a predetermined amount of time after the opening of the first switch, and wherein the control circuit is further operable to open a previously closed third switch coupled across a differential output of a fourth amplifier stage a predetermined amount of time after the opening of the second switch.

2. The preamplitier circuit of claim 1, wherein the plurality of amplifier stages comprise four amplifier circuits coupled together in series, and wherein each of the four amplifier circuits has a gain associated therewith which is greater than zero.

3. The preamplifier circuit of claim 1, wherein the power delivery circuit is further operable to provide power to each of the amplifier stages at about the same time.

4. The preamplifier circuit of claim 1, wherein the power delivery circuit comprises power supply circuitry coupled to each of the amplifier stages through switching circuitry, and wherein the switching circuitry is operable to deliver power from the power supply circuitry to each of the amplifier stages at about the same time, thereby decreasing a collective settling time associated with a powering up of the preamplifier circuit.

5. The preamplifier circuit of claim 1, further comprising a pole shifting circuit operably coupled to one of the amplifier stages, wherein the pole shifting circuit is operable to increase a cutoff frequency associated with a high pass filter circuit, and thus reject a glitch having a frequency less than the cutoff frequency from propagating to an output of the preamplifier circuit.

6. The preamplifier circuit of claim 5, wherein the pole shifting circuit is operable to shift a pole in a feedforward circuit to increase the cutoff frequency associated with the high pass filter circuit.

7. The preamplifier circuit of claim 5, wherein the pole shifting circuit is operable to increase the cutoff frequency of the high pass filter circuit at about the time the power delivery circuit provides power to the amplifier stages.

8. The preamplifier circuit of claim 7, wherein the pole shifting circuit is operable to decrease the cutoff frequency of the high pass filter back to about an initial frequency after a predetermined period of time.

9. The preamplifier circuit of claim 5, wherein the pole shifting circuit is coupled to a third amplifier stage of the plurality of amplifier stages, and wherein the pole shifting circuit comprises:

another amplifier stage having a differential input coupled to differential inputs of the third amplifier stage;

a low pass filter circuit having an input coupled to a differential input of the another amplifier stage; and a subtraction circuit coupled to the differential output of the third amplifier stage and coupled to an output of the low pass filter circuit, wherein the subtraction circuit is operable to subtract an output of the low pass filter circuit from an output of the third amplifier stage, thereby resulting in a high pass filter which is operable to reject signals at the output of the third amplifier stage which are below a cutoff frequency associated therewith.

10. A preamplifier circuit for a hard disk drive for providing reduced write-to-read switching times, comprising:

a plurality of amplifier stages having differential inputs and differential outputs associated therewith, the plurality of amplifier stages coupled together in series with one another;

a DC bias delivery circuit for selectively providing positive and negative DC bias voltages to each of the plurality of amplifier stages, wherein the DC bias delivery circuit is operable to deliver the positive and negative DC bias voltages to each of the amplifier stages at about the same time; and a squelch circuit associated with the amplifier stages, and operable to short a differential input or a differential output of one or more of the amplifier stages during delivery of the positive and negative DC bias voltages to the amplifier stages, thereby preventing glitches associated with the DC bias voltages to saturate the preamplifier circuit when transitioning from a write state to a read state wherein the preamplifier circuit comprises four amplifier stages, and wherein the squelch circuit comprises:

a control circuit; and three switching circuits operably coupled to the control circuit, a first switching circuit coupled across a differential input of a first amplifier stage, a second switching circuit coupled across a differential input of a fourth amplifier stage, and a third switching circuit is coupled across a differential output of the fourth amplifier stage, wherein the control circuit is operable to close the three switching circuits when the hard disk drive is in a non-read state and operable to selectively open each of the three switching circuits according to a predetermined timing when the hard disk drive is transitioning to a read state.

11. The preamplifier circuit of claim 10, wherein the DC bias delivery circuit comprises a plurality of switches operable to couple a respective positive or negative DC bias voltage to the plurality of amplifier stages, respectively, and wherein each of the plurality of switches are operable to provide such coupling at about the same time.

12. The preamplifier circuit of claim 11, further comprising a control circuit operable to open the plurality of switches when the hard disk drive is in a non-read state and close the plurality of switches during a read state.

13. The preamplifier circuit of claim 10, wherein the control circuit associated with the three switching circuits is operable to open the first switching circuit before the second switching circuit, and operable to open the second switching circuit before the third switching circuit, thereby preventing a possible glitch associated with an opening of the first and second switching circuits from saturating an output of the preamplifier circuit.

14. The preamplifier circuit of claim 13, wherein the control circuit is operable to detect an initiation of a read state, and open the first, second and third switching circuits consecutively based on a first, second and third predetermined timing delay measured from the detection of the initiation of the read state.

15. The preamplifier circuit of claim 14, wherein the first predetermined timing delay is about 55 ns, the second predetermined timing delay is about 65 ns, and the third predetermined timing delay is about 70 ns, respectively.

16. The preamplifier circuit of claim 10, further comprising a pole shifting circuit associated with the amplifier stages, and operable to selectively reject signals propagating through one or more of the amplifier stages which are below a predetermined cutoff frequency.

17. The preamplifier circuit of claim 16, wherein the pole shifting circuit is operable to have a pole at an initial location associated therewith which dictates the cutoff frequency at a first frequency value during a non-read state, and is further operable to move the pole to a second location to increase the cutoff frequency to a second frequency value and thus reject a greater range of low frequencies during a first portion of a detected read state, and further operable to move the pole back to about the initial location and decrease the cutoff frequency back to about the first frequency value and thus reject a substantially smaller range of low frequencies during a second portion of the detected read state.

18. The preamplifier circuit of claim 17, wherein a first portion of the detected read state corresponds to a time period when the amplifier stages are settling due to being activated at the initiation of the read state, and the second time portion of the detected read state corresponds to a time period when data is being detected at a head of the hard disk drive and amplified via the amplifier stages for reading thereof.

19. The preamplifier circuit of claim 16, wherein the pole shifting circuit comprises:

another amplifier stage having differential inputs coupled to differential inputs of a third stage of the plurality of amplifier stages;

a low pass filter circuit having an input coupled to a differential output of the another amplifier stage, and output a signal having frequency components above the predetermined cutoff frequency substantially rejected; and a subtraction circuit having inputs coupled to the differential output of the third amplifier stage, and inputs coupled to the low pass filter circuit, and an output coupled to the differential input of a fourth amplifier stage, wherein the subtraction circuit is operable to subtract the signal from the low pass filter circuit from a signal output from the third amplifier stage, thereby resulting in an output signal having frequency components below the predetermined cutoff frequency substantially rejected and thus rejecting low frequency glitches in the preamplifier circuit.

20. A method of reducing a write-to-read switching time in a hard disk drive preamplifier circuit, comprising the steps of:

detecting an initiation of a read state;

coupling one or more DC bias voltages to a plurality of amplifier stages in the preamplifier circuit substantially concurrently upon the detection of the read state; and selectively activating the plurality of amplifier stages in a predetermined order upon the detection of the read state, thereby preventing potential glitches from the substantially concurrent coupling of the DC bias voltages from saturating the preamplifier circuit wherein the preamplifier circuit comprises four amplifier stages having differential inputs and differential outputs, and wherein the four amplifier stages are coupled together in series, wherein selectively activating the plurality of amplifier stages in the predetermined order comprises:

shorting out the differential inputs of the first and fourth amplifier stages and the differential output of the fourth amplifier stage prior to the detection of the read state;

disabling a short circuit condition associated with the differential input of the first amplifier stage a first predetermined time period after the detection of the read state;

disabling a short circuit condition associated with the differential input of the fourth amplifier stage a second predetermined time period after the detection of the read state, wherein the second predetermined time period is greater than the first predetermined time period; and disabling a short circuit condition associated with the differential output of the fourth amplifier stage a third predetermined time period after the detection of the read state, wherein the third predetermined time period is greater than the second predetermined time period.

21. The method of claim 20, wherein coupling the DC bias voltages to the plurality of amplifier stags substantially concurrently comprises coupling the DC bias voltages to each of the plurality of amplifier stages at about the same time.

22. The method of claim 21, wherein coupling the DC bias voltages to the plurality of amplifier stages comprises closing a switch associated with each of the plurality of amplifiers at about the same time, thereby coupling the DC bias voltages to each of the amplifier stages, respectively.

23. The method of claim 20, wherein selectively activating the plurality of amplifier stages comprises the steps of:

maintaining differential inputs associated with at least two of the amplifier stages squelched prior to the detecting of the read state;

deactivating a squelch of a first of the amplifier stages after a first predetermined time period after the detection of the read state; and deactivating a squelch of a second of the amplifier stages after a second predetermined time period after the detection of the read state, wherein the second predetermined time period is greater than the first predetermined time period.

24. The method of claim 20, further comprising the step of selectively increasing a cutoff frequency of a high pass filter circuit associated with the amplifier stages upon the detection of the read state for a predetermined period of time, thereby increasing a range of frequencies which are rejected by the high pass filter and preventing low frequency glitches from saturating the preamplifier circuit upon the detection of the read state.

25. The method of claim 24, wherein increasing the cutoff frequency of the high pass filter comprises moving a pole associated therewith for a predetermined period of time.

* * * * *